(12) United States Patent
Huchard

(10) Patent No.: US 7,395,701 B2
(45) Date of Patent: Jul. 8, 2008

(54) METHOD OF SECURING A TIRE-BASED UNIT OF A TIRE CONDITION SENSING SYSTEM TO A RIM AND AN ASSOCIATED APPARATUS

(75) Inventor: Xavier Huchard, Pont-Du-Chateau (FR)

(73) Assignees: Michelin Recherche et Technique S.A. (CH); TRW Automotive, U.S., LLC, Livonia, MI (US)

( * ) Notice: Subject to any disclaimer, the term of this patent is extended or adjusted under 35 U.S.C. 154(b) by 53 days.

(21) Appl. No.: 11/431,357

(22) Filed: May 10, 2006

(65) Prior Publication Data

US 2006/0254349 A1 Nov. 16, 2006

(30) Foreign Application Priority Data

May 12, 2005 (EP) .................. 05291027

(51) Int. Cl.
*G01L 17/00* (2006.01)
(52) U.S. Cl. ............................................ 73/146
(58) Field of Classification Search ........ 73/146–146.8; 340/442–447
See application file for complete search history.

(56) References Cited

U.S. PATENT DOCUMENTS

| | | | | |
|---|---|---|---|---|
| 4,384,482 A | * | 5/1983 | Snyder | 73/146.5 |
| 4,409,586 A | * | 10/1983 | Hochstein | 340/448 |
| 4,701,742 A | * | 10/1987 | Ruehr | 200/61.25 |
| 4,954,677 A | * | 9/1990 | Alberter et al. | 200/83 Y |
| 5,452,608 A | * | 9/1995 | Green | 73/146.8 |
| 5,663,496 A | * | 9/1997 | Handfield et al. | 73/146.5 |
| 5,945,908 A | * | 8/1999 | Nowicki et al. | 340/447 |
| 6,016,102 A | * | 1/2000 | Fortune et al. | 340/442 |
| 6,263,560 B1 | | 7/2001 | Edwards | 29/798 |
| 6,655,203 B2 | * | 12/2003 | Hsu | 73/146.8 |
| 6,694,807 B2 | | 2/2004 | Chuang et al. | 73/146.5 |
| 6,805,000 B1 | * | 10/2004 | Sheikh-Bahaie | 73/146.8 |
| 6,829,925 B2 | * | 12/2004 | Nespo et al. | 73/146 |
| 7,055,917 B2 | | 6/2006 | Huchard et al. | 303/188 |

(Continued)

FOREIGN PATENT DOCUMENTS

EP 1447244 8/2004

(Continued)

*Primary Examiner*—Andre J. Allen
*Assistant Examiner*—Jermaine Jenkins
(74) *Attorney, Agent, or Firm*—Fitzpatrick, Cella, Harper & Scinto

(57) ABSTRACT

A method of securing a tire-based unit (24) of a tire condition sensing system (12) to a rim (60) and an associated apparatus (62) are provided. The method comprising the steps of: positioning a mounting bracket (124) on the rim (60); positioning a self-pierce rivet (140, 200) against the mounting bracket (124), so that a portion of the mounting bracket (124) is interposed between the self-pierce rivet (140, 200) and the rim (60); pressing the self-pierce rivet (140, 200) against the mounting bracket (124) and toward the female mold portion of the press, so as to pierce a portion of the mounting bracket and to deep draw a portion of the rim into the female mold portion to secure the mounting bracket relative to the rim; removing the rim and secured mounting bracket from the press; and attaching the tire-based unit (24) to the mounting bracket (124).

14 Claims, 4 Drawing Sheets

U.S. PATENT DOCUMENTS

| | | | |
|---|---|---|---|
| 7,168,305 B2 * | 1/2007 | Narayanaswamy | 73/146 |
| 7,242,284 B2 * | 7/2007 | Taguchi | 340/426.33 |
| 2004/0183658 A1 | 9/2004 | Yamagiwa et al. | 340/427 |
| 2006/0254349 A1 | 11/2006 | Huchard | 73/146.8 |

FOREIGN PATENT DOCUMENTS

| | | |
|---|---|---|
| JP | 2004243821 | 9/2004 |

* cited by examiner

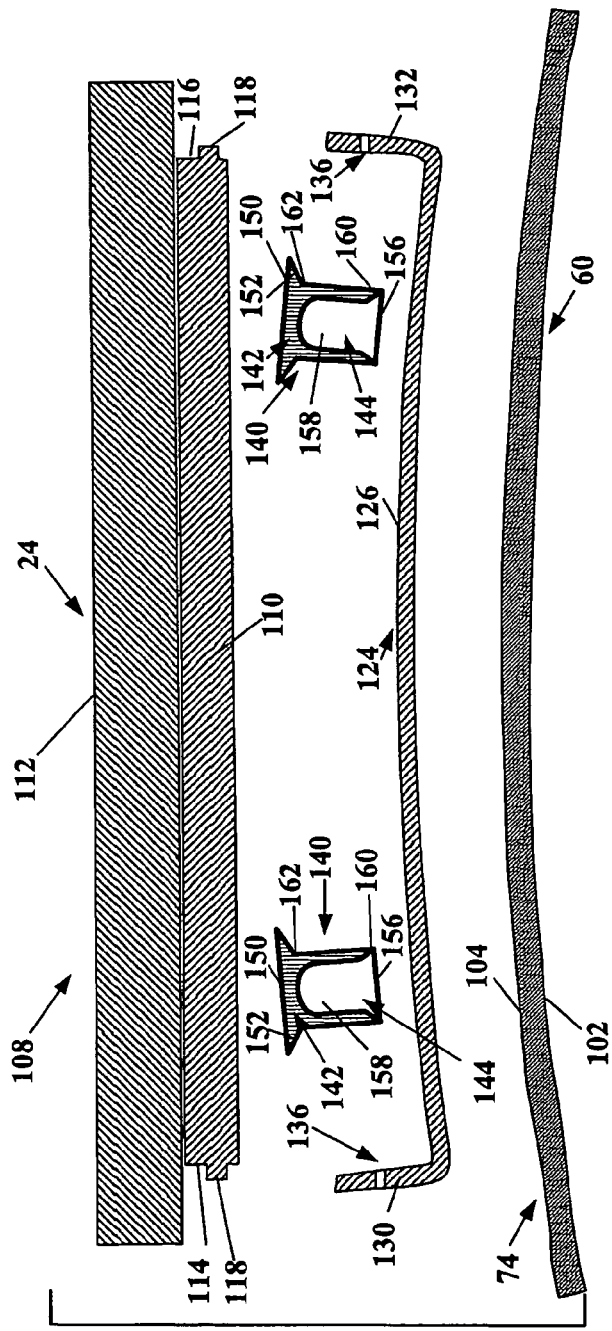
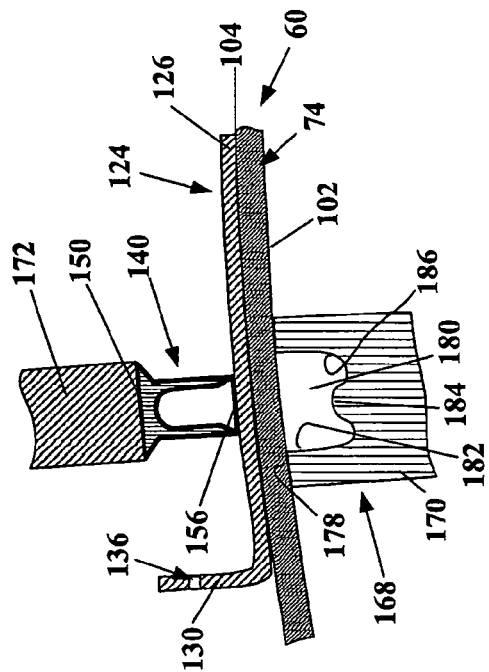
Fig. 3
Fig. 4

METHOD OF SECURING A TIRE-BASED UNIT OF A TIRE CONDITION SENSING SYSTEM TO A RIM AND AN ASSOCIATED APPARATUS

CROSS-REFERENCE TO RELATED APPLICATIONS

This application claims priority to European Patent Application 05291027.0, filed May 12, 2005, which is incorporated herein by reference in its entirety.

BACKGROUND OF THE INVENTION

1. Field of the Invention

The present invention relates to a method of securing a tire-based unit of a tire condition sensing system to a rim and to an associated apparatus. More particularly, the present invention relates to a method of securing a tire-based unit to a rim using a self-pierce rivet and an associated apparatus.

2. Description of the Related Art

A typical tire condition sensing system for a vehicle includes a vehicle-based unit and a plurality of tire-based units. Each tire of the vehicle has an associated tire-based unit. Each associated tire-based unit senses a condition of its tire and provides a signal to the vehicle-based unit indicative of the sensed parameter. Common tire conditions that are sensed by the tire-based unit include tire pressure and tire temperature.

It is common to secure an associated tire-based unit to the rim upon which its tire is mounted. One known method for securing the tire-based unit to the rim includes extending a strap circumferentially around the rim and securing the tire-based unit to the strap. A potential drawback to the use of the strap, however, is that the strap may slip relative to the rim. This slipping of the strap may affect the balance of the tire.

It is also known to secure a tire-based unit to a rim using an adhesive. Adhesives, however, typically degrade over time, especially when subjected to the temperatures common in a vehicle tire. Also, special surface preparation of the rim may be required for the adhesive to property adhere to the rim.

Another known method attaches a mounting bracket to the rim using rivets. The tire-based unit is secured to the mounting bracket. A drawback of using rivets is that each rivet is associated with a hole that extends through the rim. Air may escape the tire through the associated rivet holes. As a result, the associated rivet holes must be sealed to prevent air leaks.

SUMMARY OF THE INVENTION

The present invention relates to a method of securing a tire-based unit of a tire condition sensing system to a rim. The method comprises the steps of: positioning a mounting bracket on the rim; disposing the rim and the mounting bracket in a press between a female mold portion and a self-pierce rivet; pressing the self-pierce rivet against the mounting bracket and toward the female mold portion of the press, so as to pierce a portion of the mounting bracket and to deep draw a portion of the rim into the female mold portion to secure the mounting bracket relative to the rim; removing the rim and secured mounting bracket from the press; and attaching the tire-based unit to the mounting bracket.

In accordance with another aspect, the present invention relates to an apparatus for a vehicle having a tire condition sensing system. The apparatus comprises a rim upon which a tire of the vehicle is mounted. The apparatus also comprising a tire-based unit of the tire condition sensing system. The tire-based unit includes electronics for sensing a condition of the tire and for transmitting a signal indicative of the sensed condition. The apparatus further comprises a mounting bracket to which the tire-based unit is attachable. The mounting bracket is positioned on the rim. The apparatus still further comprises a self-pierce rivet for securing the mounting bracket to the rim. The self-pierce rivet, when positioned against the mounting bracket and pressed against the mounting bracket, pierces a portion of the mounting bracket and deep draws a portion of the rim so that the self-pierce rivet secures the mounting bracket and the deep drawn portion of the rim.

In accordance with yet another aspect, the method of the present invention uses advantageously a self-piercing rivet comprising a shank with a first end, a second, free, end and an outer periphery; and an enlarged head at the first end of the shank with a non-circular outer periphery, wherein the second end of the shank is provided with a bifurcating slot extending in an axial direction of the shank, from the second end thereof and transversely therethrough; and wherein the outer periphery of the head does not extend in the transverse direction (d) of extension of the slot, substantially beyond the outer periphery of the shank of the rivet on at least one side of the shank.

Preferably, the self-pierce rivet is disposed with the transverse direction (d) of extension of the slot oriented in the axial direction of the rim.

The use of such a slotted self-pierce rivet allows placing the rivet at a significantly smaller distance of the flanges of the drop well without deep drawing the material of the drop well portion in the axial direction. This is very advantageous in the case of steel wheel comprising a rim and a disk assembled under the drop well of the rim.

BRIEF DESCRIPTION OF THE DRAWINGS

The foregoing and other features of the present invention will become apparent to those skilled in the art to which the present invention relates, upon reading the following description with reference to the accompanying drawings, in which:

FIG. 3 is exploded view of a portion of the apparatus of FIG. 2;

FIG. 4 illustrates a portion of the apparatus of FIG. 2 located in a press during formation of the apparatus.

DETAILED DESCRIPTION OF THE PREFERRED EMBODIMENT

Figure 1:
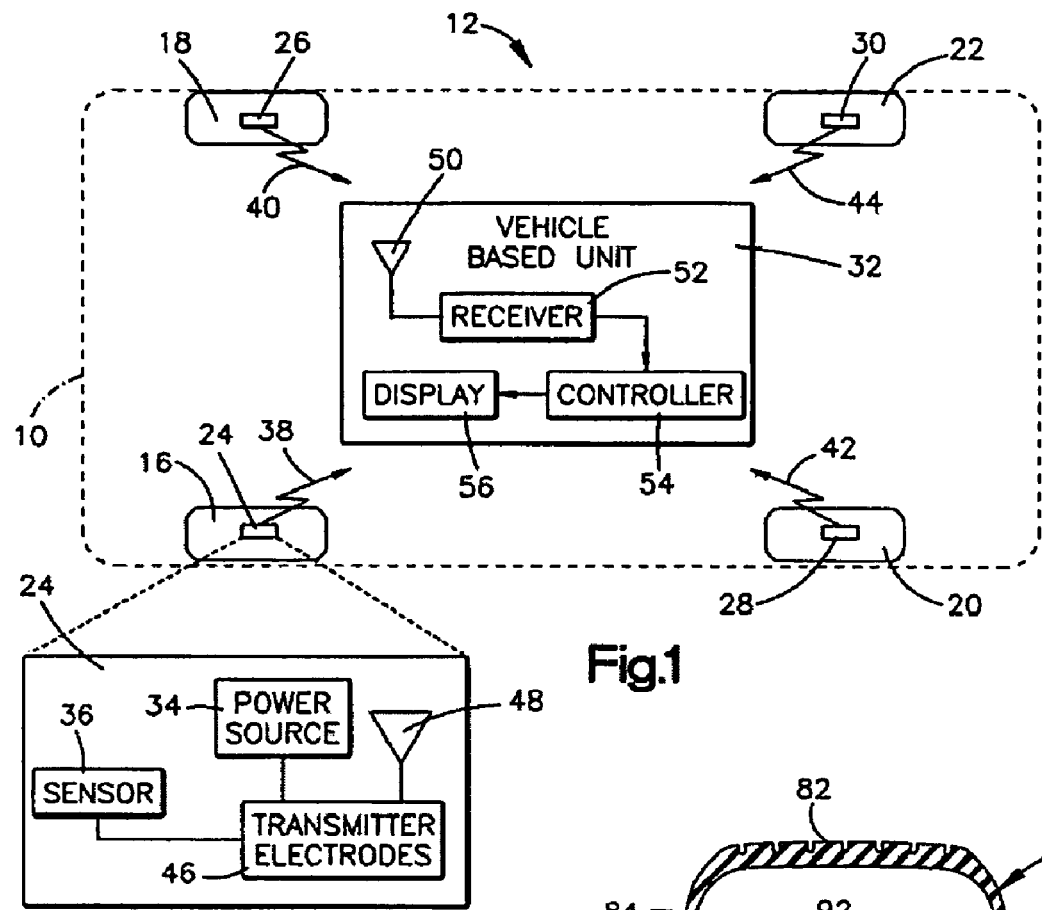
FIG. 1 schematically illustrates a vehicle having a tire condition sensing system and apparatuses constructed in accordance with the method of the present invention.

FIG. 1 schematically illustrates a vehicle 10 including a tire condition sensing system 12. For illustrative purposes, the vehicle 10 of FIG. 1 is an automobile having four tires 16, 18, 20, and 22. Vehicles having a number of tires other than four are also contemplated by the present invention.

The tire condition sensing system 12 of FIG. 1 includes four tire-based units 24, 26, 28, and 30 and a vehicle-based unit 32. Each tire 16, 18, 20, and 22 of the vehicle 10 includes an associated tire-based unit 24, 26, 28, and 30, respectively. Each of the associated tire-based units 24, 26, 28, and 30 includes electronics for sensing at least one condition of the tire and for transmitting a tire condition signal indicative of the sensed condition(s) to a vehicle-based unit 32 of the tire condition sensing system 12. The sensed tire condition(s) may include one or both of inflation pressure and temperature, as well as various other conditions. The transmitted tire condition signals for the tire-based units 24, 26, 28, and 30 are indicated in FIG. 1 as tire condition signals 38, 40, 42, and 44, respectively.

As shown in FIG. 1 with reference to tire-based unit 24, the electronics of tire-based unit 24 include a power source 34 for providing the tire-based unit with electrical energy, a sensor 36 for sensing tire conditions, transmitter electronics 46 for providing the associated tire condition signals 38, and an antenna 48 from which the tire condition signals 38 are transmitted. Preferably, the tire condition signals 38 that are transmitted by the tire-based unit 24 are a radio frequency ("RF") signals. Tire-based units 26, 28, and 30 include electronics similar to those of tire-based unit 24.

The vehicle-based unit 32 includes an antenna 50 that is connected to a receiver 52. Tire condition signals 38, 40, 42, and 44 received by the antenna 50 are demodulated in the receiver 52. Each demodulated tire condition signal is then transferred to a controller 54 of the vehicle-based unit 32. The controller 54 of the vehicle-based unit 32 operates an algorithm for determining whether the received tire condition signal under consideration originated from one of the tire-based units 16, 18, 20, and 22 associated with the vehicle 10. The algorithm operated by the controller 54, upon determining that the received tire condition signal originated from one of the tire-based units 24, 26, 28, and 30 associated with the vehicle 10, also determines from which of the tire-based units the tire condition signal originated.

The controller 54 of the vehicle-based unit 32 is operatively connected to a display 56 or other device for providing a vehicle operator with tire condition information. Preferably, the display 56 is located within the occupant compartment of the vehicle 10 and provides the vehicle operator with visual information regarding the tires 16, 18, 20 and 22 of the vehicle.

Figure 2:
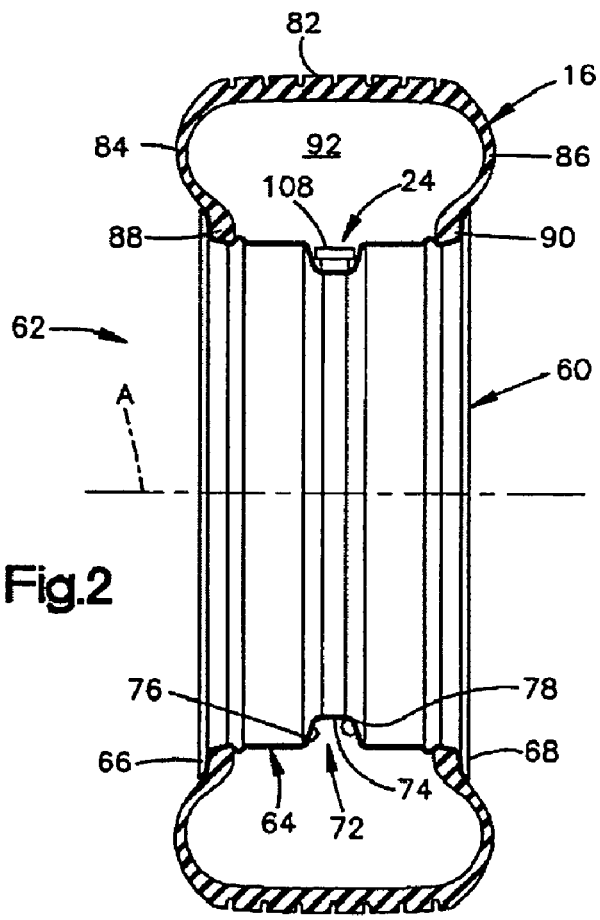
FIG. 2 illustrates an exemplary apparatus of FIG. 1.

Each of the tires 16, 18, 20, and 22 of the vehicle 10 is mounted on an associated rim. FIG. 2 illustrates tire 16 mounted on rim 60. The tire-based unit 24 that is associated with tire 16 is secured to the rim 60. The method for securing the tire-based unit 24 to the rim 60 will be discussed in detail below. An apparatus in accordance with the present invention is formed from an assembly of a tire, its associated rim, and its associated tire-based unit. For example, FIG. 2 illustrates apparatus 62 formed from an assembly of tire 16, rim 60, and tire-based unit 24.

For purposes of brevity, the present application will only specifically discuss the method of securing tire-based unit 24 to rim 60, which is associated with fire 16. It should be understood that tire-based units 26, 28, and 30 may be secured to the associated rims of tires 18, 20, and 22 using the same method as is used for securing tire-based unit 24 to rim 60.

FIG. 2 is a cross-sectional view of the apparatus 62. As shown in FIG. 2, the tire-based unit 24 is secured to the rim 60 at a location within tire 16. In the embodiment illustrated in FIG. 2, the rim 60 is formed from metal. The rim 60 may be formed from any malleable material that is suitable for use as a vehicle rim. The rim 60 includes an annular base wall 64. Inner and outer bead flanges 66 and 68 are located on opposite sides of the base wall 64. A drop well 72 extends into the base wall 64 and toward a center (axis A) of the rim 60. The drop well 72 extends circumferentially around the rim 60 and includes a lower wall 74 and opposite side walls 76 and 78.

The sidewalls 84 and 86 of the tire 16 terminate at ends opposite the tread portion 82 with bead portions 88 and 90, respectively. When the tire 16 is mounted on the rim 60, bead portion 88 seats in bead flange 66 and bead portion 90 seats in bead flange 68. Also, when the tire 16 is mounted on the rim 60, an annular chamber 92 is formed within the tire. The rim 60 defines an interior edge of the annular chamber 92.

FIG. 3 illustrates a portion of the lower wall 74 of the drop well 72. The lower wall 74 has a curved profile that is centered at the center (axis A) of the rim 60. The lower wall 74 includes inner and outer surfaces 102 and 104, respectively. The inner surface 102 is located nearer the center (axis A) of the rim 60 than the outer surface 104. The lower wall 74 has a generally uniform thickness, measured between the inner and outer surfaces 102 and 104.

As shown in FIG. 3, the tire-based unit 24 associated with tire 16 includes a protective housing 108. The protective housing 108 includes a metallic lower portion 110 and a plastic upper portion 112. The lower portion 110 has opposite ends 114 and 116, respectively. A rectangular lock tooth 118 extends outwardly of each of the ends 114 and 116. A cavity (not shown) is formed in the protective housing 108 between the lower portion 110 and the upper portion 112. The electronics of the tire-based unit 24 are located within the cavity. The cavity of the protective housing 108 is subject to the same environmental conditions as the annular chamber 92. For example, the air pressure within the cavity of the protective housing 108 is equal to the air pressure within the annular chamber 92.

A mounting bracket 124 is associated with the tire-based unit 24. The mounting bracket 124 secures the protective housing 108 of the tire-based unit to the rim 60. As is shown in FIG. 2, the tire-based unit 24 is secured to the lower wall 74 of the drop well 72. When secured to the lower wall 74 of the drop well 72, the protective housing 108 of the tire-based unit 24 is located below, or nearer to the center (axis A) of the rim 60, than the annular base wall 64. As a result, when the tire 16 is mounted on the rim 60, the bead portions 88 and 90 of the tire 16 may pass along the annular base wall 64 and over the drop well 72 without contacting the tire-based unit 24.

The mounting bracket 124 is formed from metal or another resilient material. The mounting bracket 124 includes a base portion 126 and opposite end portions 130 and 132, respectively. The base portion 126 of the mounting bracket 124 has a curved profile. The curved profile of the base portion 126 of the mounting bracket 124 corresponds to the curved profile of the lower wall 74 of the drop well 72 of the rim 60, as is illustrated in FIG. 3. The base portion 126 preferably has a width, measured into the paper as viewed in FIG. 3, that is less than half a width of the lower wall 74, measured in a direction parallel to axis A between opposite side walls 76 and 78 of the drop well 72.

The end portions 130 and 132 of the mounting bracket 124 extend from opposite ends of the base portion 126 in a direction radially outward relative to a center of the curved profile of the base portion. A rectangular opening 136 extends through each of the end portions 130 and 132. Each rectangular opening 136 is sized for receiving a rectangular lock tooth 118 of the lower portion 110 of the protective housing 108 of the tire-based unit 24 for securing the tire-based unit to the mounting bracket 124.

FIG. 3 also illustrates two self-pierce rivets 140. The two self-pierce rivets 140 illustrated in FIG. 3 are identical to one another. Each self-pierce rivet 140 is formed as a monolithic body and not from multiple structures secured together. Each self-pierce rivet 140 is formed from hardened steel.

Each of the self-pierce rivets 140 includes upper and lower portions 142 and 144, respectively. The upper portion or head 142 includes a flat, circular-shaped upper surface 150. A frustoconical side surface 152 of the head 142 narrows as it extends away from the upper surface 150. The lower portion or shank 144 of the self-pierce rivet 140 is tubular and presents a central hole 154 and a tapered mouth 156. The diameter of the shank is identical to the diameter of the neck 162 of the head 142. The surface 156 is the lower end of shank 144.

The two self-pierce rivets 140 are used for piercing the mounting bracket 124 and deep drawing the rim 60 to secure the mounting bracket relative to the rim. A number of self-pierce rivets 140 other than two may be used. By using the self-pierce rivets 140 in accordance with the method of the present invention, the mounting bracket 124 may be secured to the rim 60 without the rim being penetrated and without the rim requiring special surface preparation.

To secure the mounting bracket 124 to the rim 60, the base portion 126 of the mounting bracket 126 is positioned on the outer surface 104 of the lower wall 74 of the drop well 72 of the rim 60. Preferably, the mounting bracket 124 is positioned at equal distances from each of the side walls 76 and 78 of the drop well 72. The rim 60 and the mounting bracket 124 are then positioned in a press 168 (FIG. 4) having a female mold portion 170 and a plunger portion 172. The rim 60 and the mounting bracket 124 are positioned in the press 168 at a location between the female mold portion 170 and the plunger portion 172. FIG. 4 illustrates the lower wall 74 of the drop well 72 and the mounting bracket 124 being interposed between the female mold portion 170 and the plunger portion 172.

The female mold portion 170 of the press 168 includes an upper surface 178 upon which the inner surface 102 of the lower wall 74 of the drop well 72 is positioned. Preferably, the upper surface 178 of the female mold portion 170 has a curved profile that corresponds to the curved profile of the inner surface 102 of the lower wall 74 of the drop well 72 of the rim 60. A cavity 180 extends into the upper surface 178 of the female mold portion 170. The cavity 180 is generally cylindrical and is defined by an annular side surface or recess 182 and a centrally disposed upstanding anvil 184. A curved shoulder 186 connects the annular side surface 182 to the surface of the anvil 184. The cavity 180 has a depth, measured generally in the vertical direction as viewed in FIG. 4, that is approximately equal to the height of the self-pierce rivet 140. The height of the self-pierce rivet 140 is a distance between the upper surface 150 and the lower surface 156 of the shank 144 of the self-pierce rivet 140. The cavity 180 has a width, measured generally horizontally as viewed in FIG. 4, that is larger than the diameter of the tubular shank 144 of the self-pierce rivet 140.

The self-pierce rivet 140 is positioned on the base portion 126 of the mounting bracket 124 at a location above the cavity 180 of the female mold portion 170. When positioned on the mounting bracket 124, the lower surface 156 of the self-pierce rivet 140 abuts the base portion 126 of the mounting bracket 124 and the upper surface 150 of the self-pierce rivet is engaged by the plunger portion 172 of the press 168. Thus, as shown in FIG. 4, the rim 60, the mounting bracket 124, and the self-pierce rivet 140 are interposed between the female mold portion 170 and the plunger portion 172 of the press 168.

Figure 5:
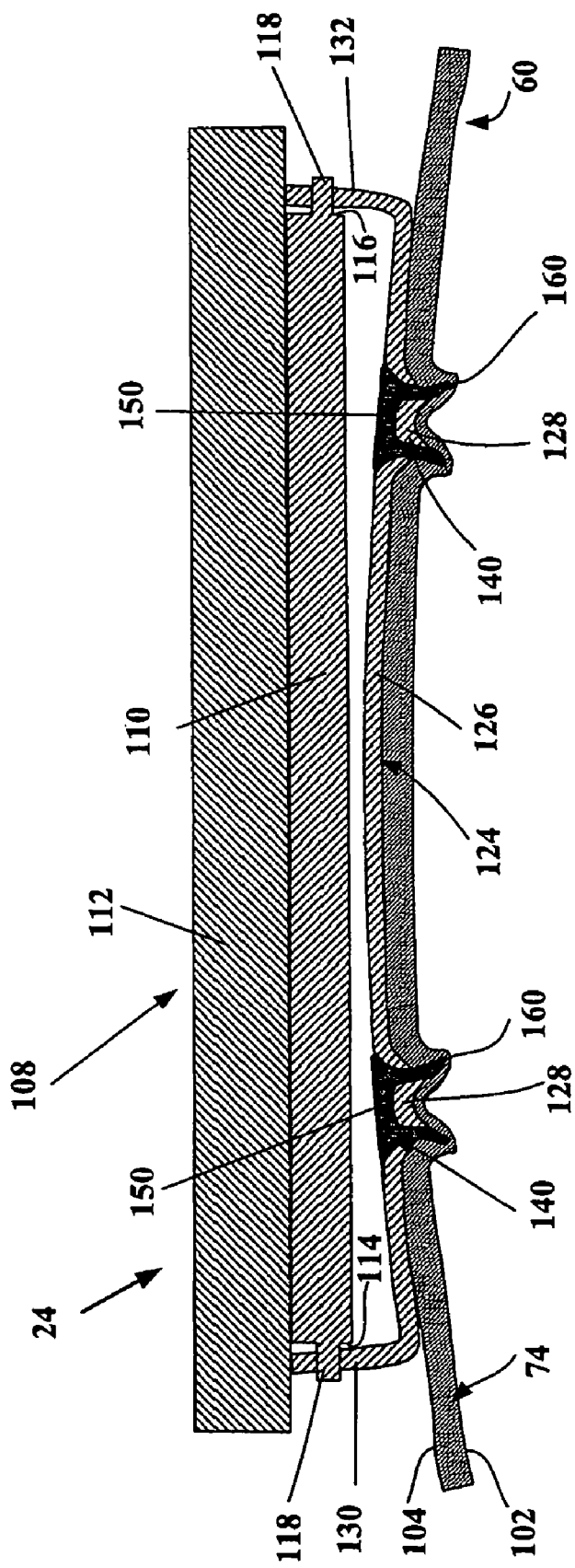
FIG. 5 is an enlarged view of a portion of the apparatus of FIG. 2 constructed in accordance with the method of the present invention.

Next, the press 168 is actuated so that the plunger portion 172 presses the self-pierce rivet 140 against the mounting bracket 124 and toward the cavity 180 of the female mold portion 172. As shown in FIG. 5, as the self-pierce rivet 140 is pressed toward the cavity 180 of the female mold portion, it acts initially as a piercing punch so that a slug 128 of material defined by the piercing of the material of the base portion 126 of the mounting bracket 124 by the rivet 140 lies within the hollow 158 of the rivet. Thereafter the slug 128 is driven forwardly with the rivet 140 and the combined slug and rivet act as a drawing punch on the lower wall 74 of the drop well 72 of the rim 60 on their path. This material displaced by the forward movement of the combined slug and rivet is drawn into the cavity 180 of the female mold portion 170. As the displaced lower wall 74 of the drop well 72 of the rim 60 reaches the anvil 184 of the female mold 170 it is trapped between the advancing rivet 140 and the anvil 184. Further forward movement of the rivet and slug causes the tubular portion of the rivet 140 to roll radially outwardly. The tubular portion of the rivet is thus spread radially outwardly and the material displaced is trapped by the recess 182 of the female mold portion 170 as can be seen with reference to FIG. 5.

After the base portion 126 of the mounting bracket 124 is secured to the lower wall 74 of the drop well 72 of the rim 60, the rim 60 and mounting bracket 124 are removed from the press 168. The method of the invention is repeated for securing the mounting bracket 124 to the rim 60 with additional self-pierce rivet 140.

After all of the self-pierce rivets 140 have been pressed into positions securing the mounting bracket 124 to the rim 60, the protective housing 108 of the tire-based unit 24 is attached to the mounting bracket. To attach the protective housing 108 to the mounting bracket 124, the rectangular lock tooth 118 on the end 114 of the lower portion 110 of the protective housing 108 is inserted through the rectangular opening 136 in the end portion 130 of the mounting bracket 124. The protective housing 108 is then pressed downward toward the base portion 126 of the mounting bracket 124 so that the rectangular lock tooth 118 on the end 116 of the lower portion 110 of the protective housing 108 snaps into the rectangular opening 136 in the other end portion 132 of the mounting bracket 124. The tire 16 is then mounted on the rim 60 in a known manner. The apparatus 62, which includes the rim 60, the tire 16, and the secured tire-based unit 24, is then ready for assembly onto the vehicle 10 having the tire condition sensing system 12.

Figure 6:
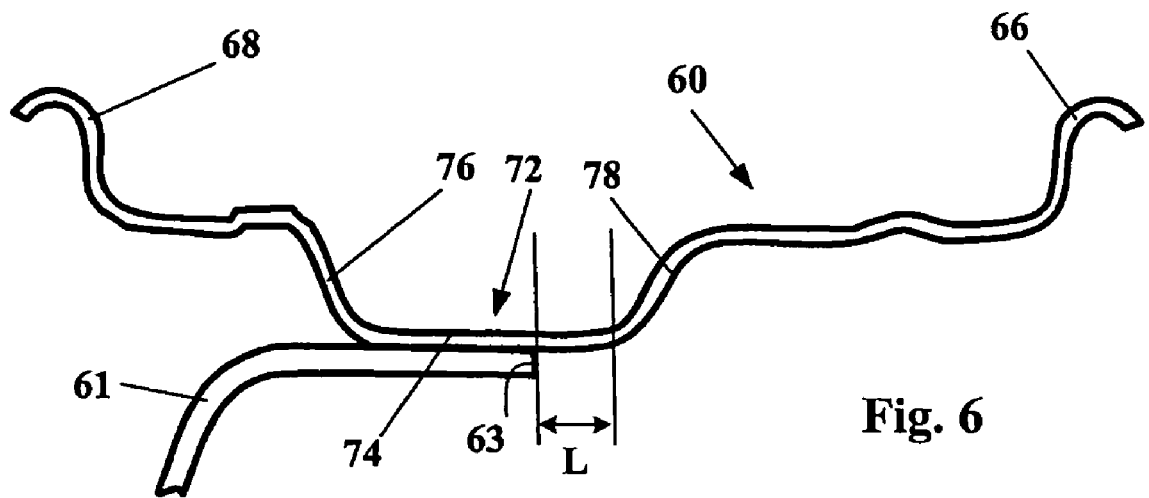
FIG. 6 is a section of a conventional rim, with assembly below the rim well.

The previous self-pierce rivet, which is axisymmetrical, is appropriate in all the cases where the thickness of the drop well portion of the wheel is regular. FIG. 6 presents a section of a steel wheel rim 60 assembled to a disk 61 under the lower wall 74 of the drop well 72. In this case the tire-based unit is preferably placed in the portion of the drop well adjacent the disk. The axial width L of this portion is limited and it is advantageous to use a slotted self-pierce rivet 200 which will expand substantially only in the circumferential direction of the rim.

Figure 7:
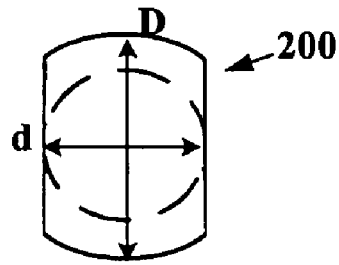
FIGS. 7-9 illustrate a preferred slotted self-pierce rivet.
Figures 8, 9:
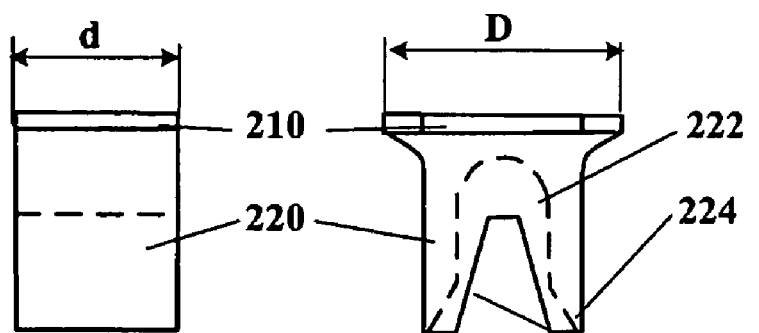

Such a slotted self-pierce rivet 200 is presented in the FIGS. 7 to 9. The slotted self-pierce rivet 200 differs from that shown in FIGS. 3-5 mainly in two respects. First, the head 210 of the slotted rivet is modified by removing two opposing sectors of the head up to the shank 220 of the rivet. Thus, the head 210 of the rivet has two opposed arcuate portions defining there between a major dimension D and two opposed straight portions defining there between a minor dimension d, the straight portions being parallel to each other and being substantially tangential to the shank 220, giving rise to a head which has a major dimension D which extends beyond the shank 220 of the rivet 200 and a minor dimension d, perpendicular to the major dimension, which does not extend beyond the shank 220 of the rivet. Second, the shank 220 of the rivet is formed with, in addition to a central hole 222 extending the length of the shank of the rivet and a tapered mouth 224, a slot 226 positioned substantially perpendicular to the straight portions of the head and extending from the mouth 224 or the central hole 222 towards the closed end thereof. The geometry of the female mold portion of the press is adapted to the geometry of the slotted self-pierce rivet in order to guide the displaced material in the appropriate circumferential direction.

The use of such a slotted self-pierce rivet allows placing the rivet at a significantly smaller distance of the flange 78 on one side and of the axial end of the disk 63 on the other side. The bifurcated slot allows securing the mounting bracket and the drop well portion of the rim by deep drawing the drop well portion mainly in the circumferential direction of the rim. A circumferential section of the tire-based unit mounted on the rim is very similar to FIG. 5.

The slotted rivet 200 described here is just an example of the numerous versions possible. Other examples are presented, for example, in U.S. Pat. No. 6,263,560, which is incorporated herein by reference.

From the above description of the invention, those skilled in the art will perceive improvements, changes and modifications. Such improvements, changes and modifications within the skill of the art are intended to be covered by the appended claims.

What is claimed is:

1. A method of securing a tire-based unit of a tire condition sensing system to a rim, the method comprising the steps of:
    positioning a mounting bracket on the rim;
    disposing the rim and the mounting bracket in a press between a female mold portion and a self-pierce rivet;
    pressing the self-pierce rivet against the mounting bracket and toward the female mold portion of the press so as to pierce a portion of the mounting bracket and to deep draw a portion of the rim into the female mold portion to secure the mounting bracket relative to the rim;
    removing the rim and secured mounting bracket from the press; and
    attaching the tire-based unit to the mounting bracket.

2. The method of claim 1 wherein the step of positioning the mounting bracket further includes the step of positioning the mounting bracket in a drop well of the rim.

3. The method of claim 2, further including the step of positioning the mounting bracket on a lower wall of the drop well of the rim.

4. The method of claim 3, wherein the step of attaching the tire-based unit further includes the step of positioning the tire-based unit in the drop well of the rim so that the tire-based unit is located nearer a center of the rim than an annular wall of the rim into which the drop well extends.

5. The method of any one of claims 1 to 4, wherein the step of pressing the self-pierce rivet further includes the step of piercing a portion of the mounting bracket and deep drawing a portion of the rim into the female mold portion toward a center of the rim.

6. The method of any one of claims 1 to 4, wherein the step of attaching the tire-based unit further includes the steps of inserting a first lock tooth of the tire-based unit into an associated opening in the mounting bracket; pressing the tire-based unit toward the base portion of the mounting bracket; and snapping a second lock tooth of the tire-based unit into an associated opening in the mounting bracket.

7. The method of any one of claims 1 to 4, wherein the self-piercing rivet comprises a shank with a first end, a second, free, end and an outer periphery; and an enlarged head at the first end of the shank with a non-circular outer periphery, wherein the second end of the shank is provided with a bifurcating slot extending in an axial direction of the shank, from the second end thereof and transversely therethrough; and wherein the outer periphery of the head does not extend in the transverse direction (d) of extension of the slot, substantially beyond the outer periphery of the shank of the rivet, on at least one side of the shank.

8. The method of claim 7, wherein the self-pierce rivet is disposed with the transverse direction (d) of extension of the slot oriented in the axial direction of the rim.

9. An apparatus for a vehicle having a tire condition sensing system, the apparatus comprising:
    a rim upon which a tire of the vehicle is mounted;
    a tire-based unit of the tire condition sensing system, the tire-based unit including electronics for sensing a condition of the tire and for transmitting a signal indicative of the sensed condition;
    a mounting bracket adapted for attachment with the tire-based unit, the mounting bracket being positioned on the rim; and
    a self-pierce rivet for securing the mounting bracket to the rim, the self-pierce rivet piercing a portion of the mounting bracket and forming a deep drawn portion of the rim, so that the mounting bracket is secured with the deep drawn portion of the rim.

10. The apparatus of claim 9 wherein the rim includes an annular wall with a drop well extending into the annular wall, and the mounting bracket is secured to the rim in the drop well.

11. The apparatus of claim 10 wherein the tire-based unit, when attached to the mounting bracket, is located in the drop well of the rim, the tire-based unit being located nearer a center of the rim than the annular wall of the rim.

12. The apparatus of any one of claim 9 to 11 wherein the mounting bracket includes opposite end portions, each of the end portions including an opening, the tire-based unit includes a housing having opposite ends, a lock tooth extending outward from each end of the housing, and the lock teeth of the housing are received in the openings of the end portions of the mounting bracket for attaching the tire-based unit to the mounting bracket.

13. The apparatus of any one of claims 9 to 11, wherein the self-piercing rivet comprises a shank with a first end, a second, free, end and an outer periphery; and an enlarged head at the first end of the shank with a non-circular outer periphery, wherein the second end of the shank is provided with a bifurcating slot extending in an axial direction of the shank, from the second end thereof and transversely therethrough; and wherein the outer periphery of the head does not extend in the transverse direction (d) of extension of the slot, substantially beyond the outer periphery of the shank of the rivet, on at least one side of the shank.

14. The apparatus of claim 13, wherein the self-pierce rivet is disposed with the transverse direction (d) of extension of the slot oriented in the axial direction of the rim.

* * * * *

UNITED STATES PATENT AND TRADEMARK OFFICE
CERTIFICATE OF CORRECTION

| | | |
|---|---|---|
| PATENT NO. | : 7,395,701 B2 | |
| APPLICATION NO. | : 11/431357 | |
| DATED | : July 8, 2008 | |
| INVENTOR(S) | : Xavier Huchard | |

It is certified that error appears in the above-identified patent and that said Letters Patent is hereby corrected as shown below:

ON THE TITLE PAGE [56] REFERENCES CITED:

FOREIGN PATENT DOCUMENTS, "JP 2004243821 9/2004" should read --JP 2004-243821 9/2004--.

COLUMN 1:

Line 66, "comprising" should read --comprises--.

COLUMN 2:

Line 43, "is exploded" should read --is an exploded--.

COLUMN 4:

Line 1, "¶ The" should read --¶ The tire 16 includes a tread portion 82 and opposite sidewalls 84 and 86.
    ¶ The--.

COLUMN 7:

Line 38, "claim 1" should read --claim 1,--.

COLUMN 8:

Line 30, "claim 9" should read --claim 9,--;
    Line 34, "claim 10" should read --claim 10,--; and

UNITED STATES PATENT AND TRADEMARK OFFICE
CERTIFICATE OF CORRECTION

PATENT NO.       : 7,395,701 B2
APPLICATION NO.  : 11/431357
DATED            : July 8, 2008
INVENTOR(S)      : Xavier Huchard It is certified that error appears in the above-identified patent and that said Letters Patent is hereby corrected as shown below:

Line 38, "claim 9 to 11" should read --claims 9 to 11,--.

Signed and Sealed this

Second Day of December, 2008

JON W. DUDAS
*Director of the United States Patent and Trademark Office*